United States Patent [19]
Amonette et al.

[11] Patent Number: 5,783,088
[45] Date of Patent: Jul. 21, 1998

[54] METHOD OF REMOVING OXIDIZED CONTAMINANTS FROM WATER

[75] Inventors: James E. Amonette; Jonathan S. Fruchter; Yuri A. Gorby, all of Richland; Charles R. Cole; Kirk J. Cantrell, both of West Richmond; Daniel I. Kaplan, Richland, all of Wash.

[73] Assignee: Battelle Memorial Institute, Richland, Wash.

[21] Appl. No.: 554,144

[22] Filed: Nov. 6, 1995

[51] Int. Cl.$^6$ .................................... C02F 1/28
[52] U.S. Cl. .................. 210/679; 210/682; 210/683; 210/691; 210/747
[58] Field of Search .................. 210/631, 679, 210/719, 747, 757, 758, 682, 683, 691

[56] References Cited

U.S. PATENT DOCUMENTS

| | | | |
|---|---|---|---|
| 4,664,809 | 5/1987 | Fenton et al. | 210/747 |
| 5,043,076 | 8/1991 | Alexander | 210/747 |
| 5,362,394 | 11/1994 | Blowers et al. | 210/617 |

OTHER PUBLICATIONS

Michelle R. Kriegman–King and M. Reinhard, "Transformation of Carbon Tetrachloride by Pyrite in Aqueous Solution", *Environ. Sci. Technol.* 1994, 28, pp. 692–700.

Michelle R. Kriegman–King and Martin Reinhard, "Transformation of Carbon Tetrachloride in the Presence of Sulfide, Biotite, and Vermiculite", *Environ Sci. Technol.* 1992, 26, pp. 2198–2206.

Michelle R. Kriegman–King and Martin Reinhard, "Reduction of Hexachloroethane and Carbon Tetrachloride at Surfaces of Biotite, Vermiculite, Pyrite, and Marcasite", *Organic Substances and Sediments in Water,* vol. 2, Processes and Analytical, R.A. Baker, Ed., Lewis Publishers, Inc., Chelsea, MI, 1991, pp. 349–364.

Linda Davis Anderson, Douglas B. Kent, and James A. Davis, "Batch Experiments Characterizing the Reduction of Cr(VI) Using Suboxic Material from a Mildly Reducing Sand and Gravel Aquifer", *Environ. Sci. Technol.,* 1994, 28, pp. 178–185.

W.P. Gates, H.T. Wilkinson, and J.W. Stucki, "Swelling Properties of Microbially Reduced Ferruginous Smectite", *Clays and Clay Minerals,* vol. 41, No. 3, 1993, pp. 360–364.

J.W. Stucki, B.A. Goodman, and U. Schwertmann, "Structural Iron in Smectites", *Iron in Soils and Clay Minerals,* Series C: Mathematical and Physical Sciences vol. 217, D. Reidel Publishing Company, 1988, pp. 625, 654–663.

*Primary Examiner*—Ivars Cintins
*Attorney, Agent, or Firm*—Paul W. Zimmerman

[57] ABSTRACT

The present invention is a method for removing oxidized contaminant(s) from water. More specifically, the invention has the steps of contacting water containing the oxidized contaminant(s) with a layered aluminosilicate having Fe(II). The aluminosilicate may contain naturally occurring Fe(II), or the Fe(II) may be produced by reducing Fe(III) that is initially present. Reduction may be either by exposure to a chemical or biological reductant. Contacting the water containing oxidized contaminant(s) may be by (1) injection of Fe(II)-containing layered aluminosilicate, via a well, into a saturated zone where it is likely to intercept the contaminated water; (2) injection of contaminated water into a vessel containing the Fe(II)-bearing layered aluminosilicate; and (3) first reducing Fe(III) in the layered aluminosilicate to Fe(II) by injection of a biological or chemical reductant, into an aquifer or vessel having sufficient Fe(III)-bearing aluminosilicate to produce the necessary Fe(II).

37 Claims, 6 Drawing Sheets

METHOD OF REMOVING OXIDIZED CONTAMINANTS FROM WATER

This invention was made with Government support under Contract DE-AC06-76RLO 1830 awarded by the U.S. Department of Energy. The Government has certain rights in the invention.

FIELD OF THE INVENTION

The present invention relates generally to a method for removing oxidized contaminants from water. More specifically, the invention involves the contact of water containing oxidized contaminant(s) with a layered aluminosilicate having Fe(II).

BACKGROUND OF THE INVENTION

Soils at many of the 3,000 U.S. Department of Energy (DOE) sites are contaminated with complex mixtures of radionuclides (e.g., uranium), metals (e.g., hexavalent chromium (Cr(VI))), anions (e.g., nitrate), and chlorinated solvents (e.g., tetrachloromethane, ($CCl_4$)) (Riley and Zachara, 1992). At the Hanford Site alone, more than 600 metric tons of $CCl_4$ were disposed to the soil in the 200 West Area, along with undetermined amounts of heavy metals and radionuclides (Stenner et al., 1988). Soils and sediments at many other industrial and governmental sites (e.g., military and civilian airfields, bus and automobile maintenance sites, metal-plating facilities, conventional-explosive manufacturing and disposal sites, etc.) contain oxidized contaminants such as chlorinated solvents, Cr(VI), nitrate-based explosives that present a potential hazard to the environment and will require remediation.

Pump-and-treat methods, requiring the removal of contaminated groundwater from the aquifer, treatment, and then disposal of the treated water back into the ground, are expensive and are limited by the rate of release of contaminants to the aqueous phase and by the hydraulic properties of the aquifer. Alternative technologies focus on treating subsurface contaminants in situ.

Trench-and-fill methods of groundwater remediation have also been proposed. For example, U.S. Pat. No. 5,362,394 to Blowes et al. describes a permeable barrier that contains an active material of organic carbon, elemental (i.e., zero-valent) iron, or ferrous iron [Fe(II)] in the form of pyrite ($FeS_2$). It further describes the need to provide a buffer material to prevent acidification of groundwater (and concomitant solubilization of trace metal contaminants from the pyrite) as a result of the oxidation of the sulfide to sulfate and the precipitation of $Fe(OH)_3$. Disadvantages of the trench-and-fill method include (1) the use of capital-intensive excavation and soil-mixing equipment, soil-mixing equipment, and extensive labor (2) repeated expenditure of equipment and labor to replenish the active material once it is depleted, (3) only shallow aquifers can be remediated because the depth of treatment is limited by the depth to which a trench can be emplaced, and (4) decreased permeability and efficacy of the active material may occur when zero- or di-valent iron is oxidized to trivalent iron and precipitates ferric oxyhydroxides.

In addition to zero-valent iron, minerals having ferrous iron [Fe(II)] have been shown to effectively decrease chromate mobility in a suboxic natural aquifer (Kent et al., 1994) and materials isolated from that aquifer (Anderson et al., 1994). This approach, however, relied on quantities of Fe(II) that occur naturally which are quite small and therefore would not provide an effective long-term barrier to the movement of oxidized contaminants in an aquifer.

Abiotic transformation of hexachloroethane (HCA) to perchloroethylene and $CCl_4$ to trichloromethane has been reported (Kriegman-King and Reinhard, 1991; 1992; 1994). This abiotic transformation relies on either the adsorption of hydrogen-sulfide ions to coarse-grained (i.e., particles greater than 75 µm in diameter) micaceous aluminosilicates (biotite and vermiculite) that have preferably been treated by sulfide, or on the presence of ferrous sulfide minerals (pyrite and marcasite). These authors hypothesized that either (1) structural Fe(II) in the aluminosilicates transferred electrons to the HCA and $CCl_4$; (2) HCA and $CCl_4$ reacted with sulfide that was adsorbed to the treated aluminosilicate; or (3) sulfide in the mineral phase, which may have been created by the reaction of soluble sulfide and Fe(II), reacted directly with the HCA and $CCl_4$. The reported data show that use of micaceous materials in the absence of sulfide requires tens of days to substantially destroy CT (60 days to convert 65% CT to $CO_2$), and HCA (half-life 57 days).

Direct microbial reduction of oxidized contaminants has also been reported. Fe(III)-reducing bacteria, such as the facultatively anaerobic bacterium *Shewanella putrefaciens* strain BrY (Caccavo et al., 1992), couple the reduction of a wide range of multivalent metals, including Fe(III), Cr(VI), and U(VI), to the oxidation of reduced organic matter or hydrogen (Lovley, 1993). These bacteria gain energy for growth by this enzymatic process under anoxic conditions and can affect the environmental fate of inorganic contaminants.

Fe(III)-reducing bacteria can also directly degrade a variety of organic contaminants. In contaminated aquifer material, Fe(III)-reducing bacteria coupled the oxidation of aromatic compounds such as benzoate, toluene, phenol, p-cresol, and 4-chloronitrobenzene, to the reduction of Fe(III) to Fe(II) (Lovley et al., 1989; Heijman et al., 1993). Reductive transformation of $CCl_4$ by an Fe(III)-reducing bacterium has also been demonstrated (Picardal et al., 1993). The use of bacteria for direct in-situ degradation of oxidized contaminants, however, is complicated by the fact that many in-situ environments are not conducive to optimal bacterial growth.

Iron-reducing bacteria have also been used in the laboratory to reduce the Fe(III) bound in sediment minerals to Fe(II) for the purpose of studying the effects of Fe(III) reduction on the physiochemical properties of fine grained aluminosilicates (Stucki et al., 1987; Wu et al., 1988; Gates et al., 1993). Although a minor amount of Fe(III) was reduced in the absence of oxygen, it is believed that the bacteria did not obtain energy for growth with Fe(III) as the sole terminal electron acceptor. In fact, more Fe(III) was reduced when oxygen initially was present in the system. These results supported the conclusion that the predominant microbial population consisted of aerobic respiratory organisms. In an engineered system, oxygen as an electron acceptor and input of a carbon electron donor would be required.

Hence, there is a need for a method of removing oxidized contaminant(s) from water that overcomes the disadvantages of the pump-and-treat, trench-and-fill, and direct-microbial methods.

SUMMARY OF THE INVENTION

The present invention is a method for removing oxidized contaminant(s) from water. More specifically, the invention is contacting water containing oxidized contaminant(s) with a layered aluminosilicate having bound Fe(II). The aluminosilicate may contain naturally occurring Fe(II), or the Fe(II) may be produced in the aluminosilicate by one of several ways. By selecting aluminosilicate having bound Fe(III), the bound Fe(III) may be reduced either by exposure to a chemical or biological reductant.

Contacting the water containing oxidized contaminant(s) may be by (1) injection of Fe(II)-containing layered aluminosilicate, via a well, into a saturated zone where it is likely to intercept the contaminated water; (2) injection of contaminated water into a vessel containing the Fe(II)-bearing layered aluminosilicate; and (3) first reducing Fe(III) in the layered aluminosilicate to Fe(II) by injection of a biological or chemical reductant, into an aquifer or vessel having sufficient Fe(III)-bearing aluminosilicate to produce the necessary Fe(II).

It is an object of the present invention to provide a method of removing oxidized contaminant(s) from water, especially groundwater, without having to move earth or soil.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
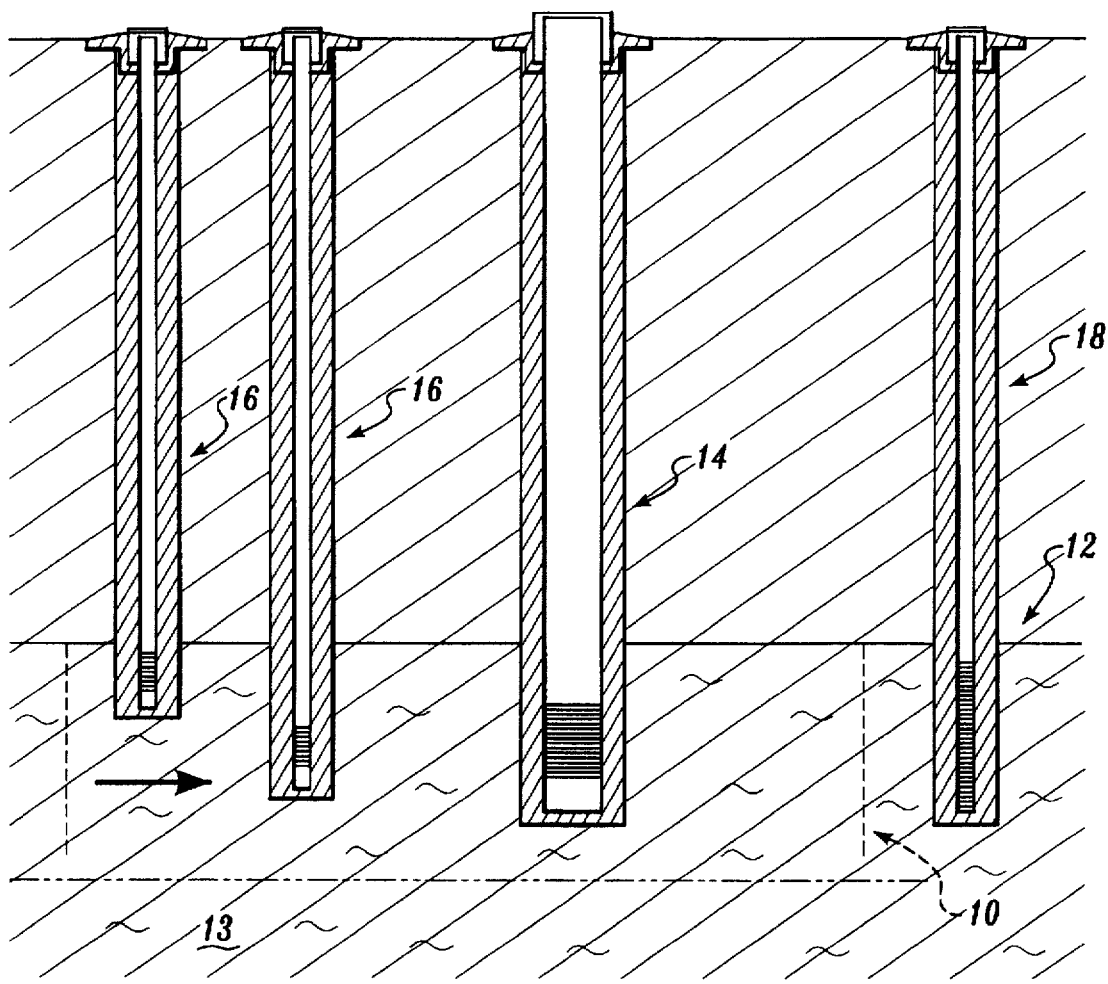
FIG. 1 is a vertical cross section of a preferred embodiment of the present invention.

The present invention is a method of removing at least one oxidized contaminant from water, especially groundwater. Ions to be removed include but are not limited to radionuclides (e.g., hexavalent uranium), metals (e.g., hexavalent chromium), anions (e.g., nitrate), and chlorinated solvents (e.g., tetrachloromethane). Contaminants are removed from water through the steps of:

(a) obtaining at least one layered aluminosilicate having bound Fe(II), wherein the layered aluminosilicate has a particle size less than about 75 micron (micrometers), preferably less than about 50 micron, more preferably less than about 25 micron, further preferably less than about 10 micron, furthermore preferably less than about 5 micron, and most preferably less than about 2 micron; and (b) contacting the water containing contaminant(s) with the layered aluminosilicate(s) for a time and reducing the oxidized contaminant(s).

The most accessible forms of iron in soils and sediments occur in those mineral phases having the highest specific surface areas, namely, iron oxyhydroxides and iron-bearing layer silicates. These two types of minerals behave quite differently, however, when the iron in them is reduced to the ferrous state. The oxide phases, which are typically dominated by ferric iron, dissolve when the iron is reduced. If sufficient carbonate is present, siderite (ferrous carbonate) may precipitate. Otherwise the iron is solubilized and will flow with the aquifer water until it is adsorbed or encounters an oxidized zone and is reprecipitated in the ferric form. In contrast, iron in the structures of layer silicates is usually retained in the mineral structure regardless of oxidation state (Stucki, 1988; Scott and Amonette, 1988). The excess positive or negative charge created by the redox reaction is usually balanced by a change in the layer charge of the mineral, i.e., in the number of exchangeable cations adsorbed to the mineral surface. In some instances, the structural iron can be ejected, particularly from layer silicates where iron is the dominant structural cation, and from chlorites that contain an iron hydroxide sheet in the interlayer space. In general, however, the iron in layer silicates remains in the mineral structure when reduced and, consequently, can be used to create a spatially fixed zone that removes redox-sensitive contaminants from groundwater.

Layered aluminosilicates are common materials including but not limited to smectite, nontronite, montmorillonite, beidellite, vermiculite, biotite, phlogopite, siderophyllite, glauconite, illite, chlorite, and combinations thereof. Layered aluminosilicates may be used alone or as found naturally, for example within a clay such as bentonite, kaolin, a sediment clay fraction, a soil clay fraction and combinations thereof. It is critical to the present invention that the layered aluminosilicate have an amount of bound iron. The term "bound" is used to denote that the molecules or atoms of iron are within the chemical lattice structure of the layered aluminosilicate or adsorbed to the surface of the layered aluminosilicate. The amount of bound iron may range from less than about 0.01 wt % to about 40 wt %. The amount of iron will depend upon the source of the layered aluminosilicate and is not critical to the invention. It will be apparent, however, that the amount of bound iron existing as Fe(II) determines how long the layered aluminosilicate will be effective in removing oxidized contaminant(s).

Particle size of less than about 50 micron, preferably less than about 25 micron, more preferably less than about 10 micron, further preferably less than about 5 micron and most preferably about 1–2 micron is desired to maximize surface area and thereby exposure of the oxidized contaminant to the iron.

The amount of time that water containing contaminant(s) must be in contact with the Fe(II) bearing layered aluminosilicate depends upon the type of contaminant in the water. For certain contaminants, for example Cr(VI), reduction is nearly instantaneous while for others, several hours may be necessary.

There are several options for (1) obtaining layered aluminosilicate having bound Fe(II) and for (2) contacting the contaminant-laden water with the Fe(II) bearing layered aluminosilicate. One option for obtaining layered aluminosilicate having bound Fe(II) is simply excavating naturally occurring deposits of layered aluminosilicate having bound Fe(II). Another option is exposing a layered aluminosilicate having bound Fe(III) to a reductant and reducing the Fe(III) to Fe(II). The reductant may be a biological reductant, a dissimilatory Fe(III)-reducing bacteria, for example the facultatively anaerobic bacterium *Shewanella putrefaciens* strain BrY, or it may be a chemical reductant, for example sodium dithionite or other dithionite or hydrosulfite.

Exposure to a reductant may occur in-situ within a zone to be treated in situations where aquifer solids present within the treatment zone have sufficient Fe(III)-bearing layered aluminosilicate. Alternatively, the Fe(III)-bearing layered aluminosilicate may have part or all of the Fe(III) reduced to Fe(II) ex situ or outside the treatment zone then injected into the treatment zone or aquifer preferably through a well.

In a preferred embodiment, as shown in FIG. 1, a spatially fixed zone 10 that is reduced in an aquifer 12 is created. It is desirable, but not necessary, that the aquifer be confined by a low-permeability zone 13 beneath the zone of treatment. The zone 10 is created first by making a well 14 useful for both injection and withdrawal, then causing layered aluminosilicate having bound Fe(II) to be present within the zone 10 surrounding the well 14. The presence of the Fe(II) containing layered aluminosilicate is preferably accomplished by reducing Fe(III) initially present in layered aluminosilicate within the aquifer 12. Reduction may be either by iron reducing bacteria, for example BrY, or by a chemical reductant, for example dithionite.

When performing chemical reduction in situ, approximately 1 pore volume of buffered reductant is injected and permitted to reduce the Fe(III) to Fe(II). An amount of time from about 4–48 hours is allowed for reduction depending upon the minerals present in the zone 10. Following reduction, the soluble reduction reaction products are removed by withdrawing about 4 or 5 pore volumes from the zone 10 through the well 14 thereby leaving only the reduced layered aluminosilicate.

In aquifer formations lacking sufficient layered aluminosilicate having bound iron, the aluminosilicate may be either first reduced then injected through the well 14 into the zone 10, or first injected then reduced. Injection of aluminosilicate colloids is done by a two step process. First, a stable colloid suspension will be created. This suspension is characterized by colloid concentration, colloid size, solution ionic strength, pH and chemical composition. The second step is injecting the colloid suspension at a sufficiently high flow rate to move the colloids through the sediment, but not at such a high rate so as to induce resuspending indigenous clays in the aquifer. While injecting the colloid suspension, a nearby well (withdrawal well) will be used to draw the injected colloids in a direction perpendicular to the flow path of the contaminant plume. The withdrawal well, would then be used as an injection well, and a third well, in line with the first two wells, would be used as a withdrawal well, thereby increasing the length of the colloid barrier. This process would continue until emplacement of the barrier is complete. Average colloid concentrations are preferably less than about 0.3% (w/w). It is further preferred that the amount of colloid added to a subsurface zone be less than about 5 vol % and more preferably less than 3 vol % of the pore space to avoid significant reduction in permeability of the subsurface zone.

In addition to the well 14 it may be desirable to have additional wells for tracking and monitoring the performance of the zone 10. For example, one or more piezometer wells 16 may be used to measure the concentrations of contaminant, reductant, pH, electrical conductivity, and reaction products. Use of a plurality of piezometer wells 16 permits measurements at different elevations within the zone 10. A downgradient or downstream monitoring well 18 may be used to confirm that upstream oxidized contaminants were removed from the groundwater within the zone 10. A plurality of monitoring wells 18 may be used depending upon the size of the aquifer 12.

Figure 2:
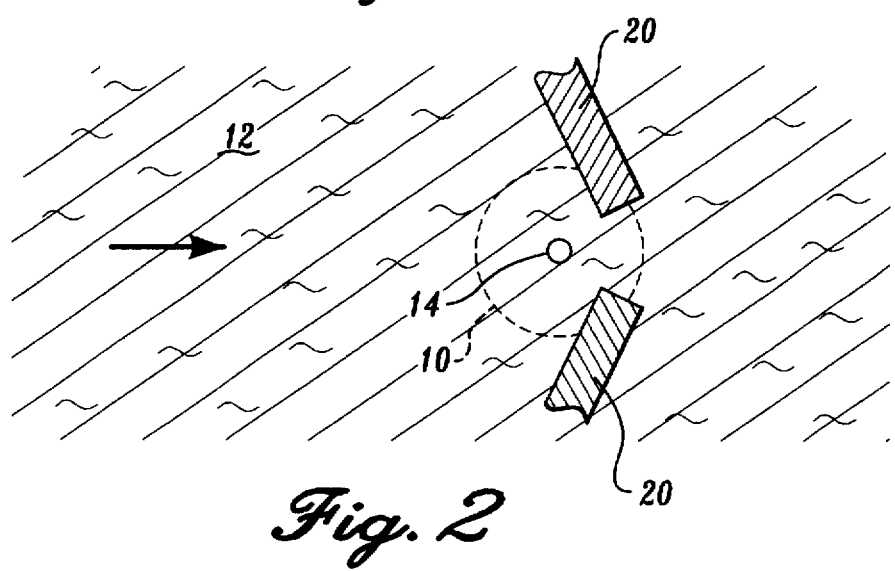
FIG. 2 is a horizontal cross section of another preferred embodiment of the present invention.

A further embodiment is shown in FIG. 2, wherein the flow of groundwater in aquifer 12 has been constrained by limited permeability barrier(s) 20. A zone 10 is created at a location wherein aquifer water is intercepted as it flows through an opening in the limited permeability barrier 20.

Bacterial Reduction of Fe(III)

Fe(III)-reducing bacteria may provide distinct advantages over other metabolically active groups of bacteria for the in-situ remediation of subsurface environments (or locales) containing radionuclides, heavy metals, and/or chlorinated hydrocarbons as cocontaminants. First, Fe(III)-reducing bacteria can use native forms of Fe(III) as the sole terminal electron acceptor for growth, and are found naturally in a wide variety of soils and anoxic sediments (Lovley, 1991). With Fe(III) as the fourth most abundant element on earth and the most abundant electron acceptor following the onset of anoxic conditions in sediments, populations of Fe(III)-reducing organisms can be maintained and/or grown without the need for expensive electron acceptor supplements.

Chemical Reduction of Fe(III)

If a chemical reagent is used, it must be capable of reducing the bound iron in clay- and silt-sized layered aluminosilicates. Furthermore, it is preferred that the reagent participate in few side reactions and be relatively nontoxic in both its original and its reacted forms. A number of the reagents commonly used in the laboratory that are capable of reducing structural iron do not meet these requirements (e.g., borohydride and stannous chloride) and are less preferred. Reduced-sulfur species, on the other hand, generally yield safe oxidized products such as sulfate, but vary in their reactivity and toxicities. One reduced-sulfur species, dithionite ion ($S_2O_4^{2-}$), is quite effective as a reductant without the side effects that limit the use of most other reductants.

EXAMPLE 1

Experiments were conducted to demonstrate the use of iron reducing bacteria for reducing Fe(III) bound in layered aluminosilicate to Fe(II).

Bacteria and Culture Conditions

The facultative Fe(III)-reducing bacterium, strain BrY (Caccavo et al., 1992), was cultured aerobically in 100 ml of tryptic soy broth without dextrose (DIFCO Laboratories, Detroit, Mich.). After incubating for 16 hr at 30° C. on a rotary shaker at 100 rpm, cells in the late log phase of growth were aseptically harvested by centrifugation (6000 x g, 15 min, 50° C.), then washed three times in sterile 10 mM piperazine-N-N'-bis 2-ethanesulfonic acid (PIPES) buffer (pH 7.0) that was previously made anoxic with $N_2$ gas. The cells were suspended to a final density of ~$10^9$ cells . $ml^{-1}$, sealed in a stoppered serum bottle under a headspace of $N_2$ gas. Cells were stored at 4° C. for no longer than 30 min before use.

Hanford groundwater growth medium (HGGM) was used for all experiments involving reduction of Fe(III) in Hanford subsurface sediments, for reductive dechlorination of $CCl_4$, and for reduction of Cr(VI). The HGGM contained the following ingredients, in grams $L^{-1}$: ammonium chloride, 0.15; monobasic sodium phosphate, 0.06; potassium chloride, 0.01. Trace vitamins and minerals (1 ml each) were added as previously described by Lovley and Phillips (1988).

Fe(III)-bearing minerals from the Hanford subsurface were added to HGGM as the sole source of electron acceptor. A ferruginous soil clay (R9), with an iron content of ~10 mmoles $g^{-1}$ was obtained from the upper Ringold formation of the Hanford Site and sieved to obtain particles less than 2 μm in diameter. Native material from the 237-ft depth (HS237) of well 299-W11-32, located in the 200 West Area, was sieved to obtain particles with less than 2 mm diameter in an anaerobic glove box to avoid oxidation of native Fe(II). The Fe(III)-bearing minerals (R9 clay or HS237 sediment) were added to 10 ml of prereduced medium to a final Fe(III) concentration of 10 mmoles $L^{-1}$. All suspensions were bubbled with $O_2$-free $N_2$ gas for an additional 5 min and the bottles were sealed with thick, butyl rubber stoppers. When appropriate, lactate served as the electron donor and carbon source and was added from an anoxic stock solution to a final concentration of 20 mM. Tubes serving as negative controls received no electron donor.

Concentrations of Fe(II) and total Fe in the Hanford materials were assayed by modifying the phenanthroline method of Templeton et al. (1994). Briefly, 2.5 ml of each clay suspension, taken through the stopper by using a needle and syringe, were added to 15 ml of a hot digestion mixture in amber bottles that contained 12 ml of 3.6N $H_2SO_4$, 2 ml of 10% phenanthroline in 95% ethanol, and 1 ml of 48% hydrofluoric acid. Samples were then digested for 30 min in boiling water, mixed with 10 ml of 5% $H_3BO_3$, and allowed to cool for 15 min. Digested samples were then diluted with 90 ml of distilled, deionized water. Exactly 1 ml of the diluted samples was transferred to amber bottles containing 10 ml of 1% sodium citrate, and the concentration of Fe (II) was determined spectrophotometrically at 512 nm. To determine the concentration of total Fe, 1 ml of the diluted sample was added to a clear scintillation vial containing 10 ml of 1% sodium citrate. This solution was irradiated with ultraviolet light for 45 min to reduce Fe(III) to Fe(II) and the absorbance was read at 512 nm.

Iron reduction was also followed by a modification of the ferrozine method (Stookey, 1970). Tubes were prepared as described above and inoculated with strain BrY to a final cell concentration of ~$10^5$ cells per ml. Tubes were sacrificed in triplicate at different time points and acidified with 0.4 ml of concentrated HCl. Acidified samples (1 ml) were diluted with 5 ml of 0.5M HCl, and 1 ml of the diluted sample was then transferred to 5 ml of ferrozine (1 g $L^{-1}$ in 10 mM n-2-hydroxyethylpiperazine-n-2-ethane-sulfonic acid buffer, pH 7.0). The concentration of Fe(II)-ferrozine complex was read at 562 nm on a Beckman DU 70 spectrophotometer.

Bacterial Reduction of Fe(III) in Hanford Sediments

Figure 3A:
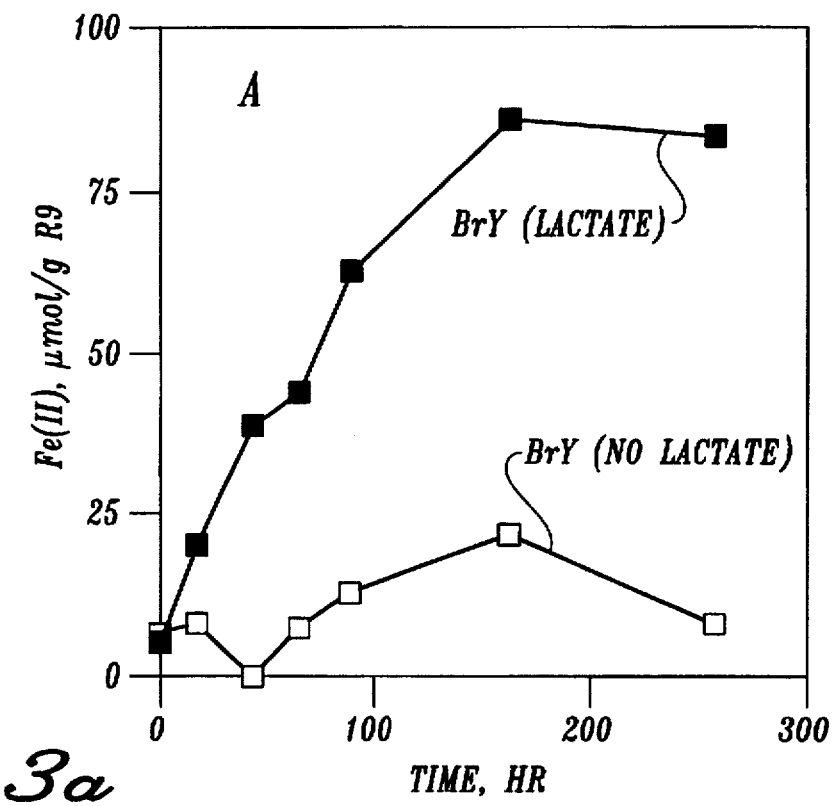
FIG. 3 shows A) the changes in Fe(II) content of the predominately smectite-bearing R9 soil clay-fraction with time as a result of contact with the iron-reducing bacterium BrY in the presence and absence of lactate (a carbon source), and B) the relation between the Fe(II) produced and the number of active BrY cells.

BrY reduced over 10% of the available Fe(III) in the R9 clay within 290 hr (FIG. 3A). Reduction was qualitatively identified by a color change from light brown to olive grey. A small amount of iron was reduced in the lactate negative control, probably due to a small amount of $H_2$ gas originating from the atmosphere of the anaerobic glove box.

Figure 3B:
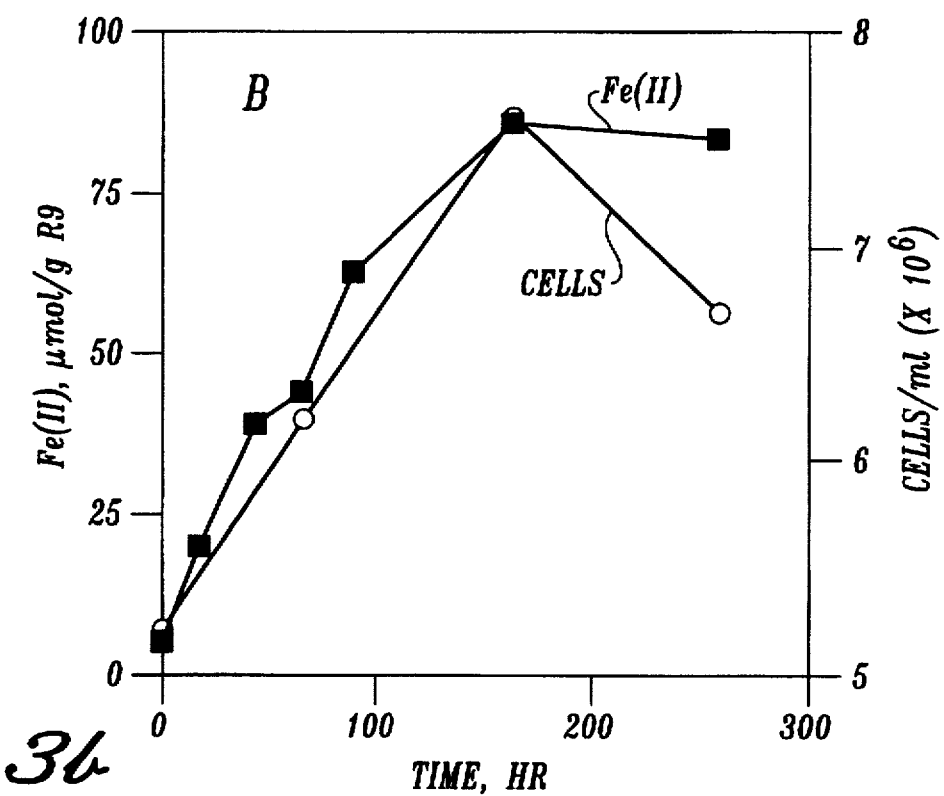

BrY grew with Fe(III) in R9 as the sole terminal electron acceptor (FIG. 3B). For each millimole that was reduced, an average of $3.2 \times 10^6$ cells were produced. Cultures were successively transferred at least 5 times under anoxic conditions. Similar results were obtained with other smectitic clays (Gorby, unpublished data). These results represent the first direct evidence that bound Fe(III) in layered aluminosilicates can support the growth of bacteria, the Fe(III) serving as the sole terminal electron acceptor. The ability of Fe(III)-reducing bacteria to grow with bound Fe(III) as the electron acceptor is an important finding because it enables the establishment and maintenance of immobile redox buffer in subsurface environments in the absence of alternative terminal electron acceptors, for example oxygen.

Clay-sized aluminosilicate minerals are common components of subsurface sediments. Sieved (<2 mm) sediment material HS237 from the Hanford subsurface contains ~8% by weight of clay-sized material. Of this fraction, over 60% is smectite containing about 6% Fe(III) by weight (Amonette, unpublished data). The total amount of Fe in these sediments was ~3% by weight, of which about 10% (i.e., 0.3% by weight) was present in the smectite.

Figure 4:
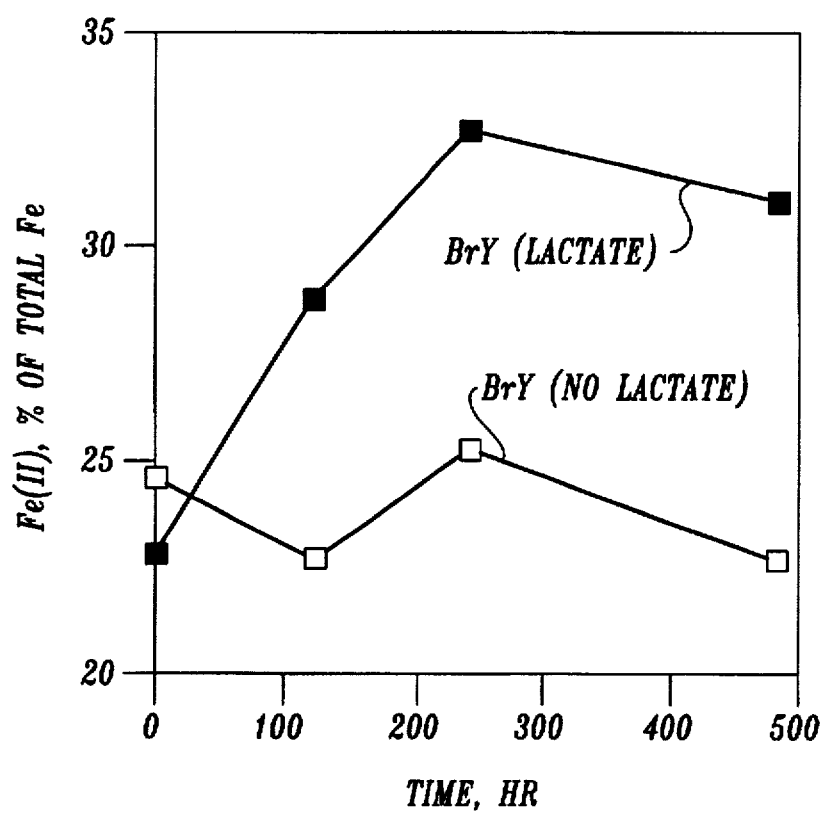
FIG. 4 shows the changes in Fe(II) content with time for the HS237 sediment, which contained Fe-bearing, clay- and silt-sized aluminosilicates, as a result of contact with the iron-reducing bacterium BrY in the presence and absence of lactate (a carbon source).

BrY reduced about 10% of the Fe(III) in untreated native material (HS237) from the Hanford subsurface (FIG. 4). Nearly 95% of the Fe(III) that was reduced remained associated with the sediment and did not partition into the aqueous phase (data not shown). Immobile Fe(II) in these sediments is vital for establishing a permeable, in-situ redox barrier. Oxidized organic and inorganic contaminants could be transported to this reducing environment through natural groundwater flow and react, either chemically or enzymatically, with reduced materials or with viable bacterial populations in this zone.

The remediation potential of this reduced material for $CCl_4$ is described in Example 2.

EXAMPLE 2

Experiments were conducted to demonstrate the use of bacterially reduced Fe(II) bound in Hanford sediment containing layered aluminosilicate minerals to dehalogenate $CCl_4$.

In an anaerobic glove box, 20-ml headspace vials received 10 ml of anoxic HGGM and either HS237 sediment or R9 clay to a final Fe(III) concentration of 10 mmol $L^{-1}$. Lactate at 20 mM served as the electron donor, when appropriate. Washed cells of BrY were then added to each vial to a final density of ~$10^5$ cells $ml^{-1}$. Vials without cells served as negative controls. Each bottle received 5 μl of a stock solution of $CCl_4$ (1000 ppm in methanol) and was immediately sealed with teflon-coated butyl rubber stoppers and aluminum crimps.

Loss of $CCl_4$ and formation of volatile degradation products were determined using a Hewlett Packard 5890 series II gas chromatograph equipped with an electron capture detector. Operating conditions were as follows: 100-m Vocal fused capillary column (Supelco, Bellefonte, Pa.); injector temperature, 250° C.; detector temperature, 200° C.; initial oven temperature, 50° C. for 1 min, initial ramp-up rate 7° C. $min^{-1}$ to 140° C., then 25° C. $min^{-1}$ to 200° for 1 min. Helium was the carrier gas, and argon/methane was the makeup gas.

Figure 5:
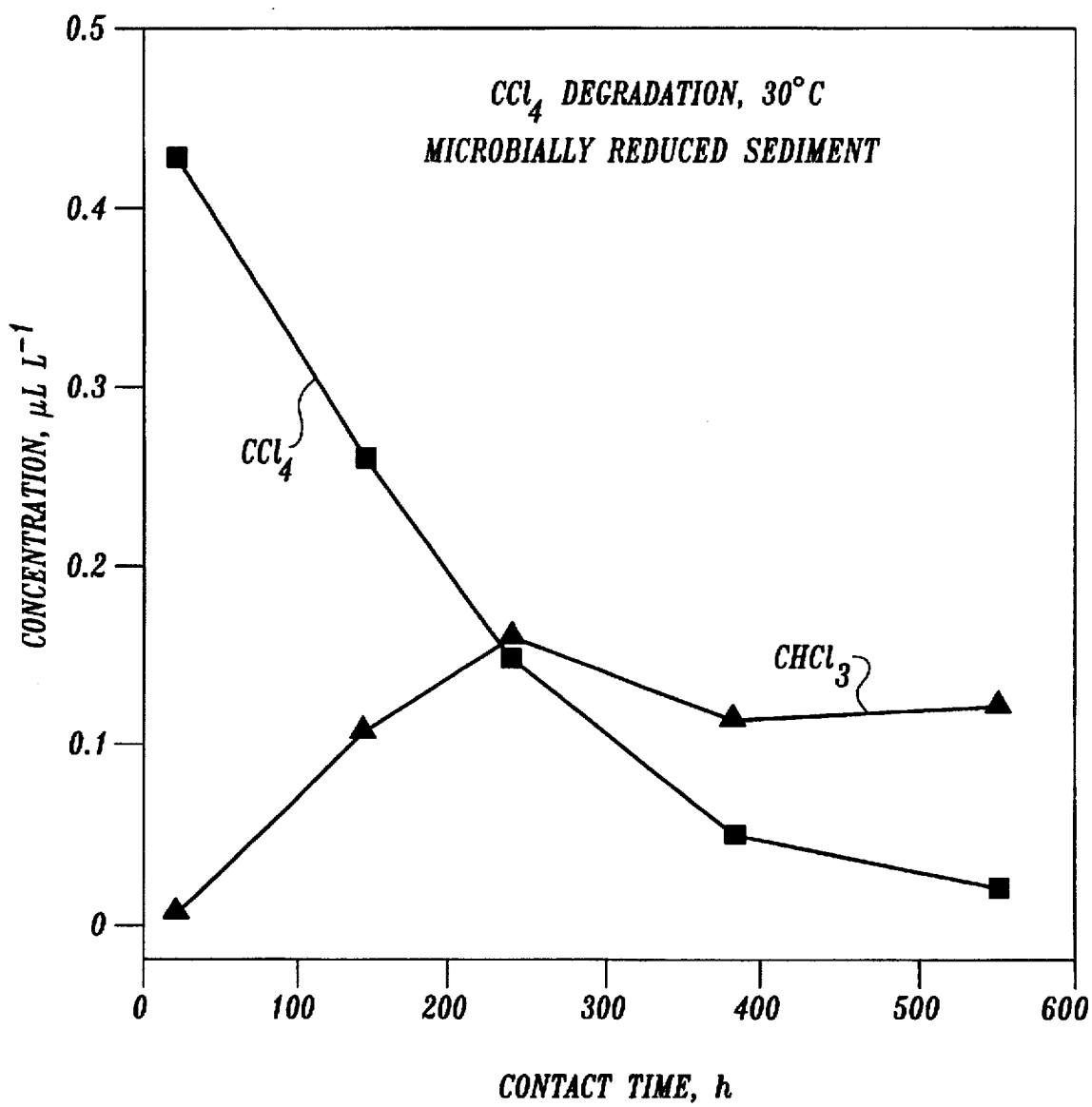
FIG. 5 shows the changes in the concentration of $CCl_4$ and its degradation product, trichloromethane, with time for a solution in contact with untreated and microbially-reduced HS237 sediment that contains Fe-bearing, clay-sized aluminosilicates.

In anoxic HGGM containing BrY, HS237 sediment, and lactate, over 98% of the initial concentration of $CCl_4$ (0.5 ppm) was degraded within 24 days (FIG. 5). A small amount (less than 10%) was transformed in tubes that lacked either bacteria or HS237 sediment. Chloroform (CF) accumulated as one of the degradation products of $CCl_4$ transformation to a concentration that was ~25% of the initial concentration of $CCl_4$. In a separate experiment using $^{14}C$-labeled $CCl_4$, the remaining 75% of the $CCl_4$ was detected as unidentified soluble organics (data not shown).

Dechlorination occurred only in tubes that contained both bacteria and HS237 sediment. BrY did not transform $CCl_4$ by a direct enzymatic mechanism. The results suggested that dechlorination under these condition was an indirect process that involved 1) the reduction of Fe(III) with 2) subsequent chemical reaction between Fe(II) and $CCl_4$. This hypothesis was supported by results from Example 3.

EXAMPLE 3

Experiments were conducted wherein layered aluminosilicate, in which the bound Fe(III) had been reduced to Fe(II) by dithionite, was used to dehalogenate $CCl_4$.

For these experiments, a bentonite from Panther Creek, MS having a bound Fe(III) content of about 6 wt % was used. This material, which was essentially pure smectite (as shown by X-ray diffraction analysis) and predominately less than 2 μm in particle size, was used as received. Duplicate 3 wt % suspensions of the smectite were prepared in 0.01M $NaHCO_3$. One of these was then treated overnight with excess 0.1M dithionite in a 0.4M $K_2CO_3$–0.04M $KHCO_3$ buffer solution at room temperature to reduce bound Fe(III) present. After reaction, this suspension was washed four times with oxygen-free 0.1M NaCl and twice with oxygen-free 0.01M $NaHCO_3$ to remove the remaining dithionite and its reaction products, brought to volume with the 0.01M $NaHCO_3$, and then stored along with the untreated 3% smectite suspension in the anoxic chamber.

The experiments were conducted at room temperature using 5-mL headspace vials. Aluminum foil was placed between the vial stoppers and the contents of the vials to minimize absorption of the organic vapors by the stoppers. A series of vials containing 1 mL of the reduced smectite suspension (i.e., 30 mg of clay) and 3 mL of an aqueous 100 μg $mL^{-1}$ solution of $CCl_4$ were prepared in the anoxic chamber. Controls containing untreated smectite with $CCl_4$, untreated smectite with no $CCl_4$, and $CCl_4$ with no smectite were also prepared and analyzed. All vials were spiked with a known amount of pentane as an internal standard. After periods ranging from a few hours to 21 days, the headspace in the vials was sampled and the composition of the volatile organic gases present (i.e., tetrachloromethane, trichloromethane, dichloromethane, and methane) determined by gas chromatography using flameionization detection.

Figure 6:
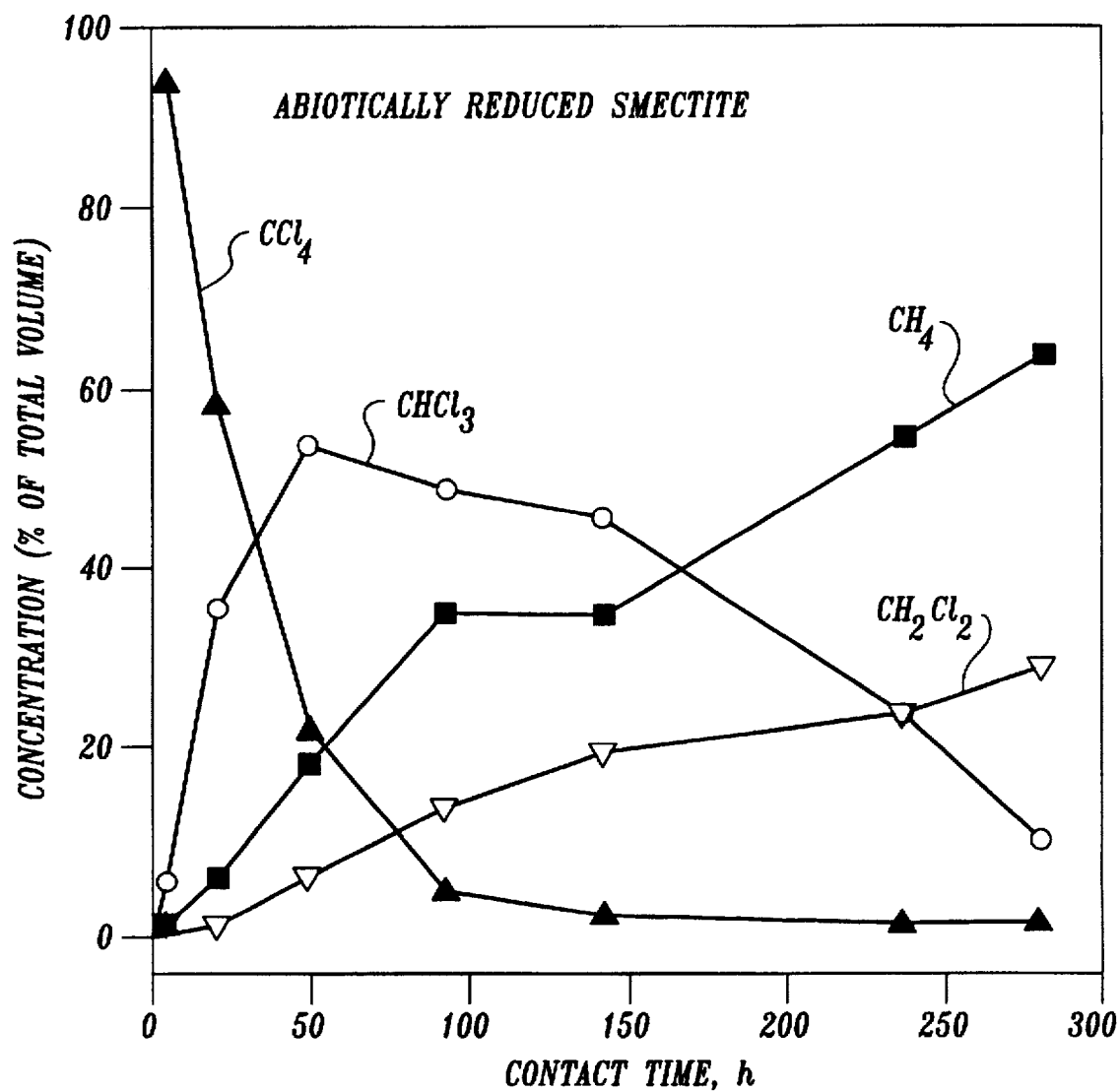
FIG. 6 shows the changes in the concentration of $CCl_4$ and its degradation products (trichloromethane, dichloromethane, and methane) with time for a solution in contact with a suspension of dithionite-reduced smectite (an Fe-bearing, clay-sized aluminosilicate).

Contact of tetrachloromethane with the reduced smectite suspensions resulted in rapid degradation of $CCl_4$ and the production of methane as well as two intermediate products, trichloromethane and dichloromethane (FIG. 6). The half-life of $CCl_4$ in this experiment was about 22 h. The concentrations of trichloromethane, produced by the removal of one chlorine atom from $CCl_4$, increased initially and then decreased as it, in turn, was dechlorinated to yield dichloromethane and methane. The concentrations of dichloromethane rose and leveled off, but did not decrease before the end of the experiment. The concentration of methane continued to rise steadily during the experiment. Because the concentration of trichloromethane continued to decrease and that of methane to increase, it is probable that the dichloromethane was being degraded. No evidence for monochloromethane was seen, suggesting that this compound is either not produced in the dehalogenation reaction or that it is readily degraded by the reduced smectite.

EXAMPLE 4

Experiments were conducted wherein layered aluminosilicate present in a sediment, in which the bound Fe(III) had been reduced to Fe(II) by dithionite, was used to remove Cr(VI) from a flowing solution.

These experiments were conducted in a constant temperature room (maintained at 20° C.) using glass columns (5.08 cm inside diameter, 30 cm long, total volume of 563 $cm^3$). The columns were packed with the <2 mm fraction of a sediment from the Hanford formation to yield bulk densities of about 1.63 g $cm^{-3}$. A 100-mesh stainless steel screen was used to retain the sediment in the column. A pump was used to inject the feed solution into the column inlet; samples of column effluent were collected manually and analyzed for chromate concentration. The minimum detection limit with this method was about 50 ng $L^{-1}$. Tygon tubing was used throughout. The feed water consisted of either (1) a synthetic groundwater (0.01M $NaHCO_3$ equilibrated with solid $CaCO_3$ for 48 hours), (2) this groundwater spiked with chromate to yield a 1000 ng $L^{-1}$ Cr(VI) concentration, or (3) the buffered 0.1M dithionite solution used in Example 3. The sediment in the column was treated with dithionite solution for 24 h, flushed with about 3 pore volumes of synthetic groundwater, and then treated with the Cr(VI)-containing groundwater until the Cr(VI) concentration in the column effluent was the same as the influent concentration. The solution flow rate in these experiments was either 4 or 10.4 mL $min^{-1}$.

Figure 7:
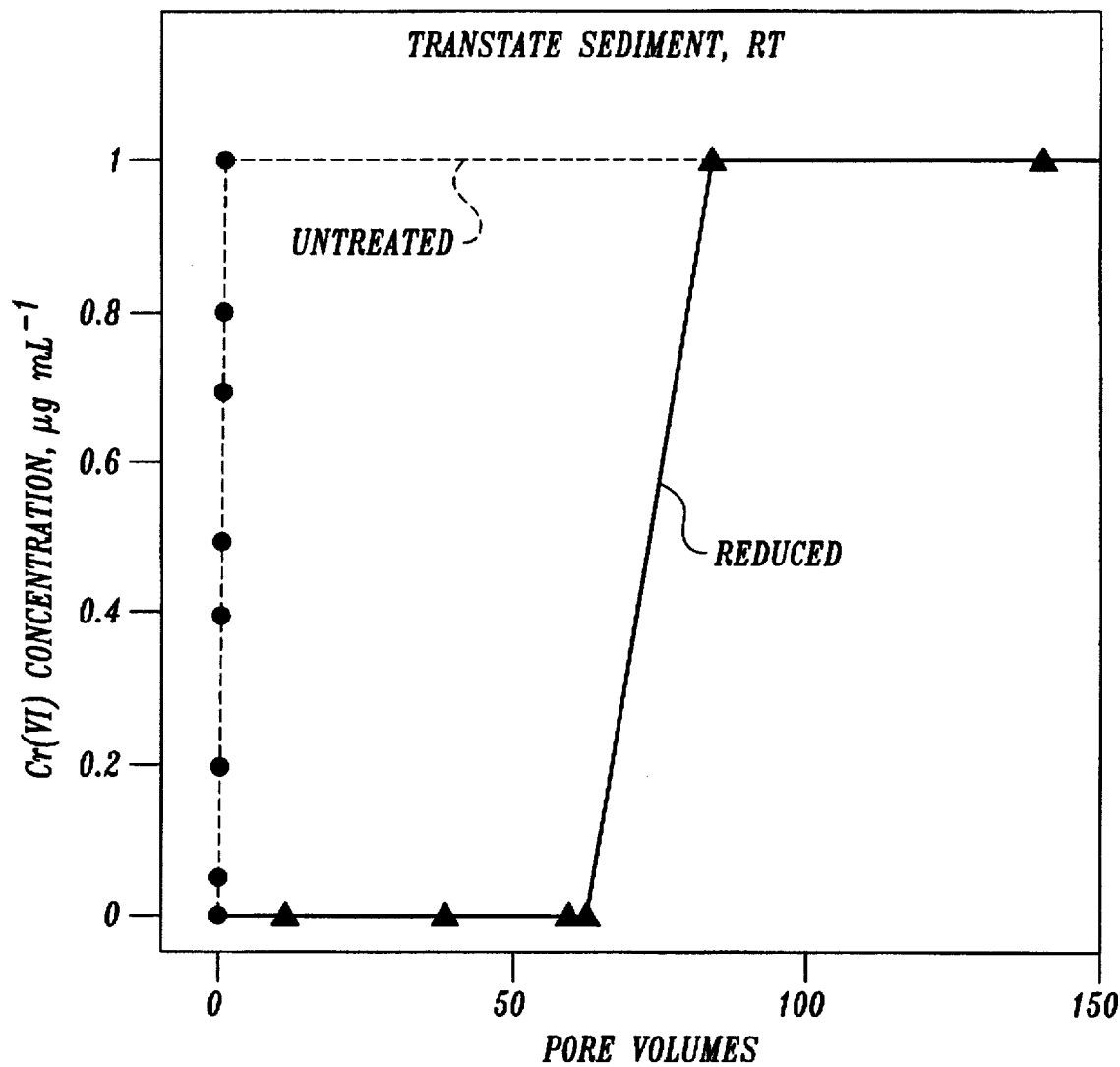
FIG. 7 shows the changes in the concentration of Cr(VI) in the effluent of columns packed with untreated or dithionite-treated sediment containing Fe-bearing, clay-sized aluminosilicates.

The results of these experiments showed that Cr(VI) was effectively removed from the flowing groundwater for about 60 to 85 pore volumes when the sediment had been reduced by dithionite (FIG. 7). Without the dithionite treatment, Cr(VI) eluted from the column in 1 pore volume or less.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

REFERENCES

Anderson, L. D., D. B. Kent, and J. A. Davis. 1994. Batch experiments characterizing the reduction of Cr(VI) using suboxic material from a mildly reducing sand and gravel aquifer. Environ Sci Technol 28:178–185.

Blowes, D. W., and C. J. Ptacek. November 1994. System for treating contaminated groundwater. U.S. Pat. No. 5,362,394.

Caccavo, J., F. R. P. Blakemore, and D. R. Lovley. 1992. A hydrogen-oxidizing, Fe(III)-reducing microorganism from the Great Bay Estuary, N.H. Appl Environ Microbiol 58:3211–3216.

Gates, W. P., H. T. Wilkinson, and J. W. Stucki. 1993. Swelling properties of microbially reduced ferruginous smectite. Clays & Clay Minerals 41:360–364.

Heijman, C. G., C. Holliger, M. A. Glaus, R. P. Schwarzenbach, and J. Zeyer. 1993. Abiotic reduction of 4-chloronitrobenzene to 4-chloroaniline in a dissimilatory iron-reducing enrichment culture. Appl Environ Microbiol 59:4350–4353.

Kriegman-King, M. R. and M. Reinhard. 1991. Reduction of hexachloroethane and carbon tetrachloride at surfaces of biotite, vermiculite, pyrite, and marcasite. In Organic Substances and Sediments in Water, Vol. 2, Processes and Analytical, R. A. Baker, Ed., Lewis Publishers, Inc. Chelsea, Mich., 1991.

Kriegman-King, M. R. and M. Reinhard. 1992. Transformation of carbon tetrachloride in the presence of sulfide, biotite, and vermiculite. Environ Sci Technol 26:2198–2206.

Kriegman-King, M. R. and M. Reinhard. 1994. Transformation of carbon tetrachloride by pyrite in aqueous solution. Environ Sci Technol 28:692–700.

Lovley, D. R. and E. J. P. Phillips. 1988. Novel mode of microbial energy metabolism: Organic carbon oxidation coupled to dissimilatory reduction of iron or manganese. Appl Environ Microbiol 54:1472–1480.

Lovley, D. R., M. J. Baedecker, D. J. Lonergan, I. M. Cozzarelli, E. J. P. Phillips, and D. I. Siegel. 1989. Oxidation of aromatic contaminants coupled to microbial iron reduction. Nature 339:297–299.

Lovley, D. R. 1991. Dissimilatory Fe(III) and Mn([V) reduction. Microbiol Rev 55:259–287.

Lovley, D. R. 1993. Dissimilatory metal reduction. Ann Rev Microbiol 47:263–290.

Picardal, F. W., R. G. Arnold, H. Couch, A. M. Little, and M. E. Smith. 1993. Involvement of cytochromes in the anaerobic biotransformation of tetrachloromethane by *Shewanella putrefaciens* 200. Appl Environ Microbiol 59:3763–3770.

Riley, R. G. and J. M. Zachara. 1992. *Chemical Contaminants on DOE Lands and Selection of Contaminant Mixtures for Subsurface Science Research*, DOE/ER-0547T. U.S. Department of Energy, Washington, D.C.

Scott, A. D. and J. E. Amonette. 1988. Role of iron in mica weathering, pp. 537–623. In: *Iron in Soils and Clay Minerals*, J. W. Stucki, B. A. Goodman, and U. Schwertmann, eds. D. Reidel, Dordrecht, The Netherlands.

Stenner, R. D., K. H. Cramer, K. A. Higley, S. J. Jette, D. A. Lamar, T. J. McLaughlin, D. R. Sherwood and N. C. Van Houten. 1988. *Hazard Ranking System Evaluation of CERCLA Inactive Waste Sites at Hanford*, PNL-6456. Pacific Northwest Laboratory, Richland, Wash.

Stookey, L. L. 1970. Ferrozine—a new spectrophotometric reagent for iron. Anal Chem 42:779–781.

Stucki, J. W., P. Komadel, and H. T. Wilkinson. 1987. Microbial reduction of structural iron (III) in smectites. Soil Sci Soc Am J 51:1663–1665.

Stucki, J. W. 1988. Structural iron in smectites, pp. 625–675. In: *Iron in Soils and Clay Minerals*, J. W. Stucki, B. A. Goodman, and U. Schwertmann, eds. D. Reidel, Dordrecht, The Netherlands.

Templeton, J. C., J. R. Nelson, and J. E. Amonette. 1994. Improvements in the quantitative assay of nonrefractory minerals for Fe(II) and total Fe using 1,10-phenanthroline. *Program and Abstracts*, 49th Northwest Regional Meeting of the American Chemical Society, Jun. 16–18, 1994, Anchorage, Ak., American Chemical Society, Washington, D.C. Wu, J., C. B. Roth, and P. F. Low. 1988. Biological reduction of structural iron in sodium-nontronite. Soil Sci Soc Am J 52:295–296.

We claim:

1. A method of removing at least one contaminant selected from the group consisting of redox-sensitive contaminant, oxidized contaminant, and combinations thereof from water in a saturated zone beneath a surface of ground, comprising the steps of:

(a) causing to be present within said saturated zone of at least one layered aluminosilicate having bound Fe(II), said layered aluminosilicate(s) having a particle size less than 75 micron; while (b) adding an amount of colloid from 0 to about 5 vol % of a pore space thereby avoiding significant reduction in a permeability of said saturated zone; and (c) contacting said water with said layered aluminosilicate (s) for a time and reducing said contaminant with said Fe(II).

2. The method as recited in claim 1, wherein the layered aluminosilicate is selected from the group consisting of smectite, nontronite, montmorillonite, beidellite, vermiculite, biotite, phlogopite, siderophyllite, glauconite, illite, chlorite, and combinations thereof.

3. The method as recited in claim 1, wherein the layered aluminosilicate is within a clay selected from the group consisting of bentonite, kaolin, sediment clay fraction, soil clay fraction and combinations thereof.

4. The method as recited in claim 1, wherein said particle size is less than 50 microns.

5. The method as recited in claim 4, wherein said particle size is less than 25 microns.

6. The method as recited in claim 5, wherein said particle size is less than 10 microns.

7. The method as recited in claim 6, wherein said particle size is less than 5 microns.

8. The method as recited in claim 7, wherein said particle size is less than 2 microns.

9. The method as recited in claim 1, wherein the step of causing comprises the step of:

exposing a layered aluminosilicate having bound Fe(III) to a reductant and reducing Fe(III) to Fe(II).

10. The method as recited in claim 9, wherein the reductant is a Fe(III)-reducing bacterium.

11. The method as recited in claim 10, wherein the bacterium is *Shewanella putrefaciens* strain BrY.

12. The method as recited in claim 9, wherein the reductant is a chemical reductant.

13. The method as recited in claim 12, wherein the chemical reductant is a dithionite.

14. The method as recited in claim 9, wherein the step of exposing comprises the steps of:

(a) injecting an iron-reducing bacterium into the layered aluminosilicate having Fe(III); and (c) permitting the iron-reducing bacterium to reduce the Fe(III) to Fe(II).

15. The method as recited in claim 14, wherein the layered aluminosilicate having Fe(III) is located in a saturated zone and injecting is accomplished through at least one well.

16. The method as recited in claim 9, wherein the step of exposing comprises the steps of:

(b) injecting a buffered solution of sodium dithionite into the layered aluminosilicate having Fe(III);

(c) permitting the sodium dithionite to reduce the-Fe(III) to Fe(II); and (d) withdrawing reductant by-products leaving the layered aluminosilicate with Fe(II).

17. The method as recited in claim 16, wherein the layered aluminosilicate having Fe(III) is located in a saturated zone and injecting is accomplished through at least one well.

18. The method as recited in claim 1, wherein the step of causing comprises the step of:

injecting said aluminosilicate containing Fe(II) into said saturated zone.

19. The method as recited in claim 18, wherein the layered aluminosilicate having bound Fe(II) is injected into a saturated zone through at least one well.

20. A method of removing at least one redox-sensitive contaminant from groundwater flowing through an aquifer, comprising the steps of:

(a) creating a spatially fixed reduced zone in the aquifer with the steps of:

making a well extending from a ground surface into the aquifer; and (ii) causing to be present within said aquifer at least one layered aluminosilicate having bound Fe(II) and having a particle size less than about 75 microns while avoiding significant reduction in a permeability of said subsurface zone; and (b) contacting said groundwater with said layered aluminosilicate(s) for a time and reducing said contaminant with said Fe(II).

21. The method as recited in claim 20, wherein the layered aluminosilicate is a clay.

22. The method as recited in claim 20, wherein causing to be present comprises the step of:

exposing a layered aluminosilicate having bound Fe(III) to a reductant and reducing Fe(III) to Fe(II).

23. The method as recited in claim 22, wherein the reductant is a Fe(III)-reducing bacterium.

24. The method as recited in claim 23, wherein the bacterium is *Shewanella putrefaciens* strain BrY.

25. The method as recited in claim 22, wherein the reductant is a chemical reductant.

26. The method as recited in claim 25, wherein the chemical reductant is a dithionite.

27. The method as recited in claim 22, wherein the step of exposing comprises the steps of:

(a) injecting an iron-reducing bacterium into the layered aluminosilicate having Fe(III); and (c) permitting the iron-reducing bacterium to reduce the Fe(III) to Fe(II).

28. The method as recited in claim 22, wherein the step of exposing comprises the steps of:

(b) injecting a buffered solution of sodium dithionite into the layered aluminosilicate having Fe(III);

(c) permitting the sodium dithionite to reduce the Fe(III) to Fe(II); and (d) withdrawing reductant by-products leaving the layered aluminosilicate with Fe(II).

29. The method as recited in claim 28, wherein an amount of said buffered solution injected is about 1 pore volume.

30. The method as recited in claim 29, wherein withdrawing removes an amount of about 4 pore volumes of aquifer liquid containing reduction by-products.

31. The method as recited in claim 30, wherein withdrawing is through a same passage used for injecting.

32. The method as recited in claim 20, wherein causing to be present comprises, injecting an amount of said layered aluminosilicate having Fe(II) into said aquifer.

33. The method as recited in claim 20, wherein causing to be present comprises:

(a) injecting an amount of layered aluminosilicate having bound Fe(III) into said aquifer; and (b) injecting a reductant to reduce the Fe(III) to Fe(II).

34. The method as recited in claim 20, wherein the layered aluminosilicate is selected from the group consisting of smectite, nontronite, montmorillonite, beidellite, vermiculite, biotite, phlogopite, siderophyllite, glauconite, illite, chlorite, and combinations thereof.

35. The method as recited in claim 20, wherein the layered aluminosilicate is within a clay selected from the group consisting of bentonite, kaolin, sediment clay fraction, soil clay fraction and combinations thereof.

36. The method as recited in claim 20, wherein the causing comprises the steps of:

(a) injecting a pore volume of buffered solution of sodium dithionite into the layered aluminosilicate having Fe(III) through an injection path;

(c) permitting the sodium dithionite to reduce the Fe(III) to Fe(II); and (d) withdrawing at least four pore volumes of groundwater and removing reductant by-products through the injection path and leaving the layered aluminosilicate with Fe(II) thereby defining a spatially reduced zone.

37. The method as recited in claim 20, wherein said redox-sensitive contaminant is selected from the group of radionuclides, anions and chlorinated solvents.

* * * * *